(12) United States Patent
Sweetser et al.

(10) Patent No.: US 6,801,689 B1
(45) Date of Patent: Oct. 5, 2004

(54) CORRECTING THE PHASE OF WAVEGUIDE BRAGG GRATINGS

(75) Inventors: John N. Sweetser, San Jose, CA (US); Anders Grunnet-Jepsen, San Jose, CA (US); Pierre St. Hilaire, Belmont, CA (US); Alan Johnson, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 269 days.

(21) Appl. No.: 10/135,210

(22) Filed: Apr. 30, 2002

(51) Int. Cl.[7] .............................................. G02B 6/34
(52) U.S. Cl. ........................................ 385/37; 385/123
(58) Field of Search .......................... 385/31, 37, 123; 398/84; 359/563, 572, 573, 569

(56) References Cited

U.S. PATENT DOCUMENTS

| | | | | |
|---|---|---|---|---|
| 5,945,261 A | * | 8/1999 | Rourke | 430/321 |
| 6,310,996 B1 | * | 10/2001 | Byron | 385/37 |
| 6,384,977 B1 | * | 5/2002 | Laming et al. | 359/570 |
| 2002/0081068 A1 | * | 6/2002 | Matsumoto et al. | 385/37 |
| 2002/0122628 A1 | * | 9/2002 | Brennan et al. | 385/37 |

\* cited by examiner

Primary Examiner—Hemang Sanghavi
(74) Attorney, Agent, or Firm—Trop, Pruner & Hu, P.C.

(57) ABSTRACT

A waveguide may be translated relative to the optical system that creates the grating in the waveguide. Phase errors that arise from the writing process may be corrected by appropriate translations of the waveguide relative to the system that creates the grating. In some embodiments, the waveguide may be translated relative to a phase mask used to write a grating into the waveguide.

25 Claims, 3 Drawing Sheets

CORRECTING THE PHASE OF WAVEGUIDE BRAGG GRATINGS

BACKGROUND

This invention relates to the process of correcting for phase errors during the fabrication of Bragg gratings.

Bragg gratings in optical waveguides (fiber and planar) are used for a variety of optical processing functions. The most common application is simple wavelength filtering in dense wavelength-division multiplexing (DWDM) systems.

In such applications, the ideal Bragg grating filter has a spectral response that is rectangular in shape, with sharp edges and a flat top. In general, any phase or amplitude errors in the fabrication process lead to a non-ideal spectral response.

Moreover, as the DWDM channel spacing becomes smaller, the filter bandwidth must also be reduced by the same amount. The reduced bandwidth requires the Bragg grating lengths to increase. These requirements lead to a significantly increased sensitivity in the spectral quality of the filter to any errors in the fabrication process. One common source of such errors is the imperfection of the phase masks used in the fabrication process.

More generally, any filter response will be negatively affected by the presence of errors in the fabrication process. In general, the longer the grating, the more sensitive it will be to errors.

A process that can eliminate or reduce the effect of these errors is desirable and will become more valuable as more complex optical processing functionality is required.

DETAILED DESCRIPTION

Figure 1:
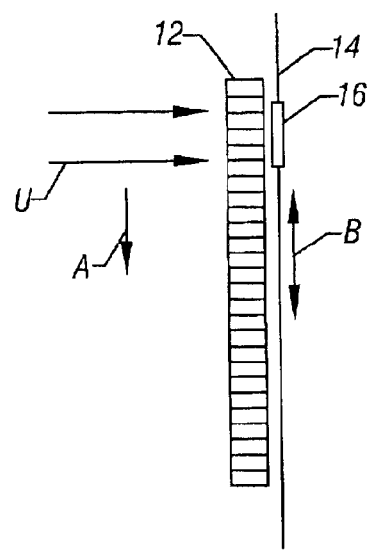
FIG. 1 is a schematic depiction of one embodiment of the present invention.

In accordance with one embodiment shown in FIG. 1, a phase correction process involves shifting the interference pattern that illuminates a waveguide 14 as the ultraviolet writing beam U is scanned along the waveguide 14. The ultraviolet writing beam U exposes a phase mask 12. In one embodiment, the ultraviolet writing beam U may be scanned along the length of the mask 12 as indicated by the arrow A. At the position of the writing beam U shown in FIG. 1, a grating 16 is formed in a waveguide 14. The waveguide 14 may be fiber or may be a planar waveguide, as two examples.

The phase correction process may achieve the proper shift of the interference pattern by making small adjustments, indicated by the arrows B, to the relative position, with respect to the waveguide 14, of one or more of the phase gratings (e.g., masks) 12 used to generate the interference pattern as the writing beam U is scanned along the waveguide 14. The magnitude and direction of the shift is directly related to the error function that is to be corrected.

Typical phase errors in the phase masks 12 used in waveguide Bragg grating production are on the order of several radians across the length of the grating 16. This translates into shifting the interference pattern by a few microns over the length of the grating 16 in order to compensate for these errors.

The resolution with which the phase errors can be reduced is limited by both the position resolution of the stage used for shifting the interference pattern and the size of the beam U used for writing the Bragg grating 16. The better the stage resolution and the smaller the writing beam U, the more precisely one can control the phase of the correction process. Typically, nanometer resolution and control are used for the positioning of the waveguide 14 with respect to the phase mask 12.

Figure 2:
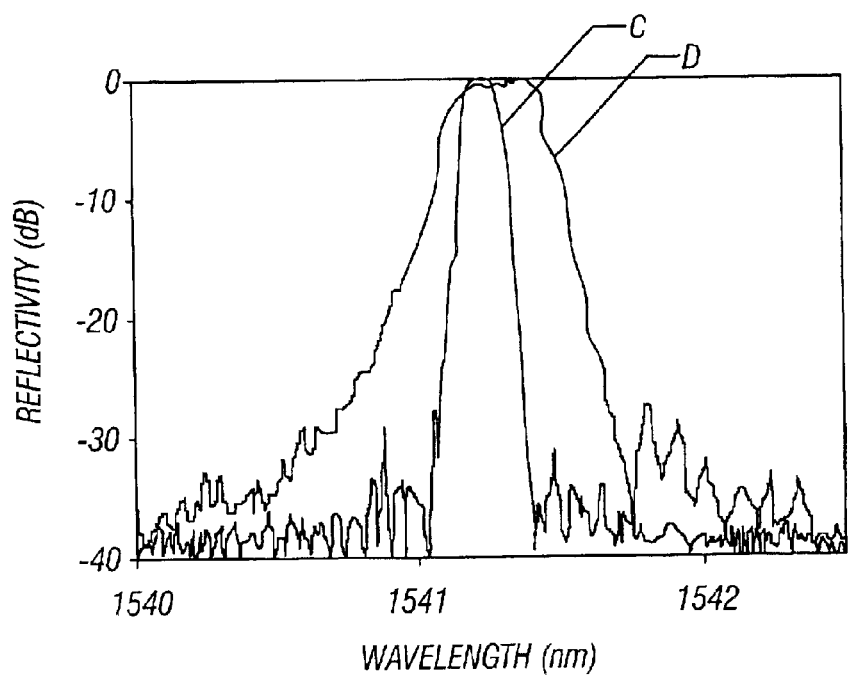
FIG. 2 is a graph showing the results with one embodiment of the present invention indicated at C and the results with a typical prior art embodiment indicated at D.
Figure 3:
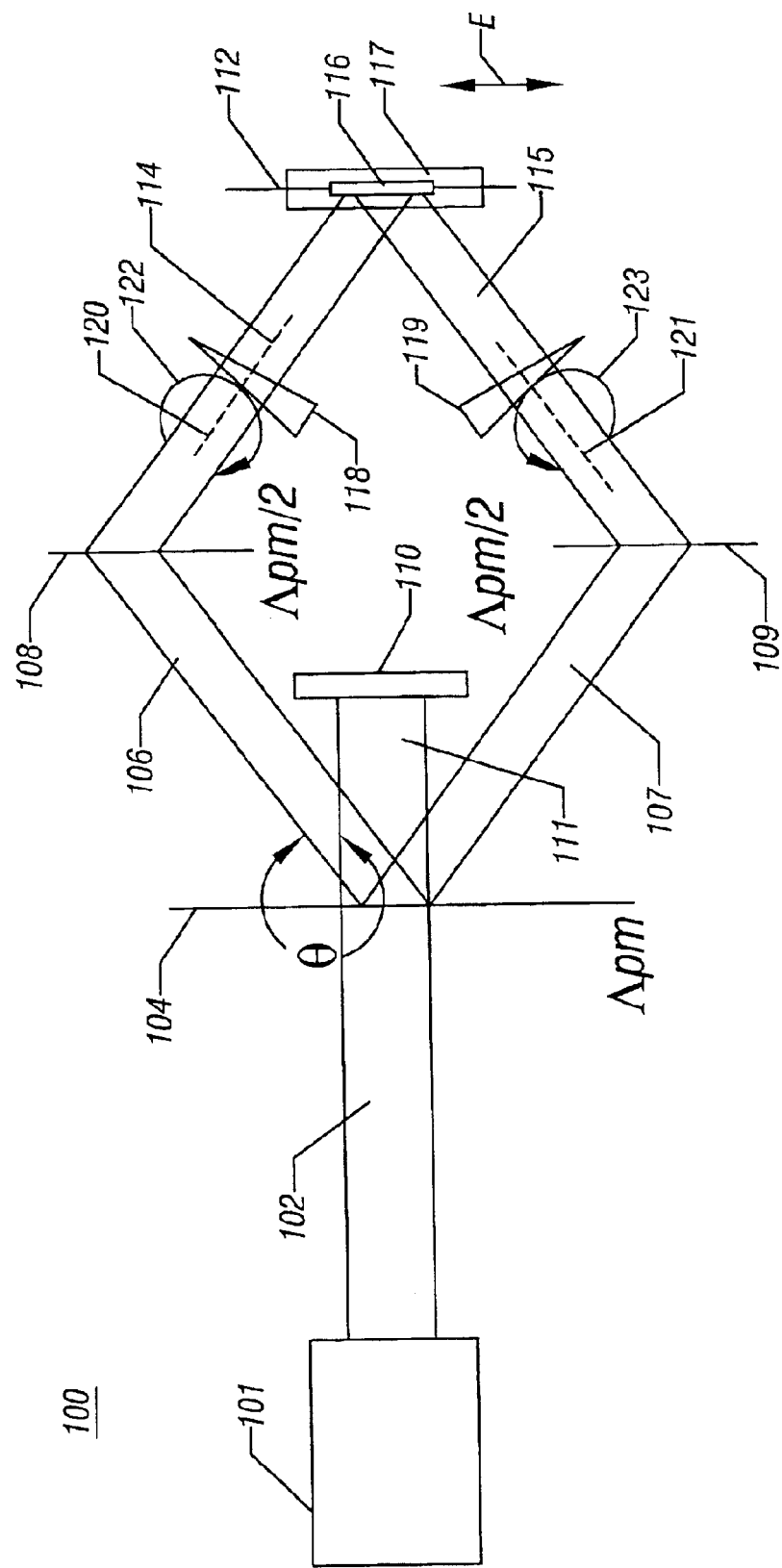
FIG. 3 is a schematic depiction of another embodiment of the present invention.

Referring to FIG. 2, a graph of reflectivity versus wavelength for a grating, in accordance with the prior art, is indicated at D and for grating 116, in accordance with one embodiment of the present invention, is indicated at C. By correcting phase mask error, a higher quality grating can be produced with a narrower spectrum, as indicated C in FIG. 2, in accordance with some embodiments of the present invention. In addition to the correction of errors associated with phase masks and translation stages used in the fabrication of Bragg gratings using standard phase mask methods, phase correction according to embodiments of the present invention may also be utilized in more advanced methods. For example, in a three-grating interferometric technique for Bragg grating fabrication, the Bragg grating wavelength may be tuned without changing any of the phase masks by any one of several means. One such method involves placing prisms or wedges 118, 119 in each arm of the interferometer 100 as shown in FIG. 3. Rotation of the prisms or wedges 118, 119 leads to a change in the period of the interference pattern and thus a corresponding change in the Bragg grating 116 wavelength.

The apparatus 100 includes a laser 101 (or other light source) that produces a laser beam 102 that is incident to a first diffraction grating 104 having a period Λ Diffraction orders 106, 107 (the +1 and −1 diffraction orders, respectively) are produced and directed to respective gratings 108, 109 that have grating periods of about Λ/2. The gratings 108, 109 may have grating periods ranging from about 80%–120% of Λ/2 in some embodiments. An undiffracted component 111 of the beam 102 is blocked by a baffle 110.

A diffraction order 114 (a−1 order) produced by the grating 108 and a diffraction order 115 (a+1 order) produced by the grating 109 are directed to circular, rotatable wedges or prisms 118 and 119. In one embodiment, the wedges 118 and 119 are arranged so that their bisector is normal to the direction of propagation of light from a grating 108, 109 to a fiber 112. The intersecting angle of the two orders 114, 115 (at the interference pattern 116) and, thus, the spatial frequency, of a Bragg grating being written in a fiber 112 is modified by rotating the wedges or prisms 118 and 119 in opposite directions indicated by the arrows 121, 122 along an axis that is parallel to the propagation direction of the light.

This process introduces a small amount of translation in the position of the beam intersection which may be compensated by translation of the waveguide or fiber 112 as indicated by the arrows E. For this purpose, the optical system 10 or the waveguide 112 may be mounted on a translation stage 117. In some implementations of this technique, a phase shift accumulates as the grating 116 is written which can distort the grating spectrum. Generally, the phase shift is linear with position along the grating 116 and the slope of phase shift versus position increases as the interferometer 100 is tuned away from its natural wavelength (determined by the phase masks). This type of phase error may be compensated using the process described above for phase mask error correction. Because of the flexibility of the three-grating interferometer, it is possible to employ other methods to achieve phase correction in addition to, or instead of, the process described above. For example, because the wedges modify the phase of the light that passes through them, it is possible to shift the phase of the exposure fringe pattern, and thus the phase of the Bragg grating, by appropriately rotating the two wedges. In this case, the wedges should be rotated in the same direction as opposed to the opposite direction as required for tuning the frequency of the Bragg grating, as described above. The degree and direction of the rotation depends on the specific phase error profile that is being corrected. Another method for implementing phase correction in the three-grating interferometer involves placing optical phase modulators in one or both arms of the interferometer. These devices serve to modify, in a prescribed manner, the optical phase of the light passing through them. Therefore, by applying the appropriate control signals to the phase modulators, one may shift the Bragg grating phase in such a way to correct for a known phase error profile. Other sources of phase errors associated with optical and/or mechanical components or procedures used in the fabrication of Bragg gratings, once quantified, may be eliminated or reduced using embodiments of the present invention.

Even if the source of a phase error is not known a priori, it is still possible to use the methods of the type described herein to correct or compensate for these errors. In such cases when the specific phase error function is not known prior to the fabrication of the grating, one may use other means to determine or estimate this quantity. One such method involves performing various measurements on the Bragg grating, either during fabrication or after the grating has been written. Determination of the appropriate optical properties of the Bragg grating can yield information about the phase profile of the grating and thus may permit reconstruction of the phase error function present during exposure of the grating.

There are a variety of methods that can be used to determine the phase function, and thus the phase error, of a Bragg grating. Generally, optical phase is not a directly detectable quantity. Therefore, the methods for the determination of optical phase rely on indirect means that can be generally labeled coherent (or phase-sensitive) and incoherent. Coherent methods are typically more accurate and more direct since they are sensitive to the phase of the signal being measured (although they do not directly measure the phase). However, they are generally difficult to implement mainly because they involve interferometric measurements, which can be extremely sensitive to environmental effects. Two such examples of coherent phase measurements that may be used to determine the phase function of a Bragg grating are spectral interferometry and Fourier Transform spectrometry. Both methods have been applied to a wide variety of optical measurements and are known in the art.

Incoherent methods are generally less accurate and less direct, but they are much easier to implement since they involve easily measurable quantities, such as spectral intensity and temporal response of the device. However, since neither of these quantities uniquely depends on the optical phase, it is more difficult to determine the phase from them.

Thus, in order to obtain the phase from incoherent methods, a phase extraction process may be used. The details of the phase extraction process depend on the types of data about the device that are available. In general, the more data that is available, the simpler the phase extraction process and the more accurate the result. Ideally, both the spectral and temporal response of the device is available. In this case, it is possible to use phase retrieval algorithms in order to extract the phase of the device. The specific algorithm for phase retrieval for Bragg gratings is a modified version of similar algorithms that are known in the art. In cases where only spectral or temporal responses are known, one may use other information about the grating in order to obtain the phase. A method that is well suited for Bragg gratings is one where only the spectral response is measured, using for example a tunable laser source and a photodetector to measure the reflected power from the grating versus wavelength. The spectral response by itself may not be sufficient to determine the phase function of the grating; however, because the fabrication of the grating involves scanning the exposure beam along the length of the phase mask or masks, one may measure the spectral response for different length gratings. One may use the set of spectral responses for different lengths in conjunction with a phase extraction process to obtain an estimate of the phase function of the grating. This method is not exact, however it is easy to implement and requires a minimum of additional measurements to be made in order to obtain an approximate phase function for the grating.

Depending on the method used to determine the phase function, it may be defined in any one of several ways, e.g., phase versus wavelength, phase versus time, or phase versus position along the grating. Since the phase correction process inherently works in the space domain, one may use the phase versus position in order to determine the phase error function. If, however, the phase extraction process yields a different phase function, it is still possible to convert it to the desired phase versus position function using techniques known in the art.

Once the phase versus position of the grating is determined, by any of the methods described herein or any other method, then the phase error function is obtained by simply comparing the measured phase function with the specific spatial phase function that was designed for the grating. In many cases, the desired phase function is a linear function across the grating (a so-called "transform-limited" grating), in which case, the phase variation determined from the phase extraction process is equal to the phase error function. Note that the linear component of the phase function is generally not relevant for phase correction and thus may be removed. In general, however, the designed phase function may be arbitrary. For example, for dispersion compensating gratings, the designed phase function may be quadratic versus position. Whatever the form of the designed phase function, the phase error function is obtained by subtracting the extracted phase function from the designed phase function. The result is the phase error function that is used in the correction process.

The correction process proceeds as described earlier using the phase error function, either directly measured (or known a priori using other means), or extracted from measurements on the grating itself as described above. Specifically, a phase correction is applied to the grating, as it is written, that is equal and opposite to the phase error. The effect of the phase correction is to remove or compensate the phase errors present in the fabrication process. Therefore, for a transform-limited grating, only the phase correction function is applied. For gratings with more complex designed phase profiles, the designed phase function must be added to the phase correction function before being applied to the grating.

Figure 4:
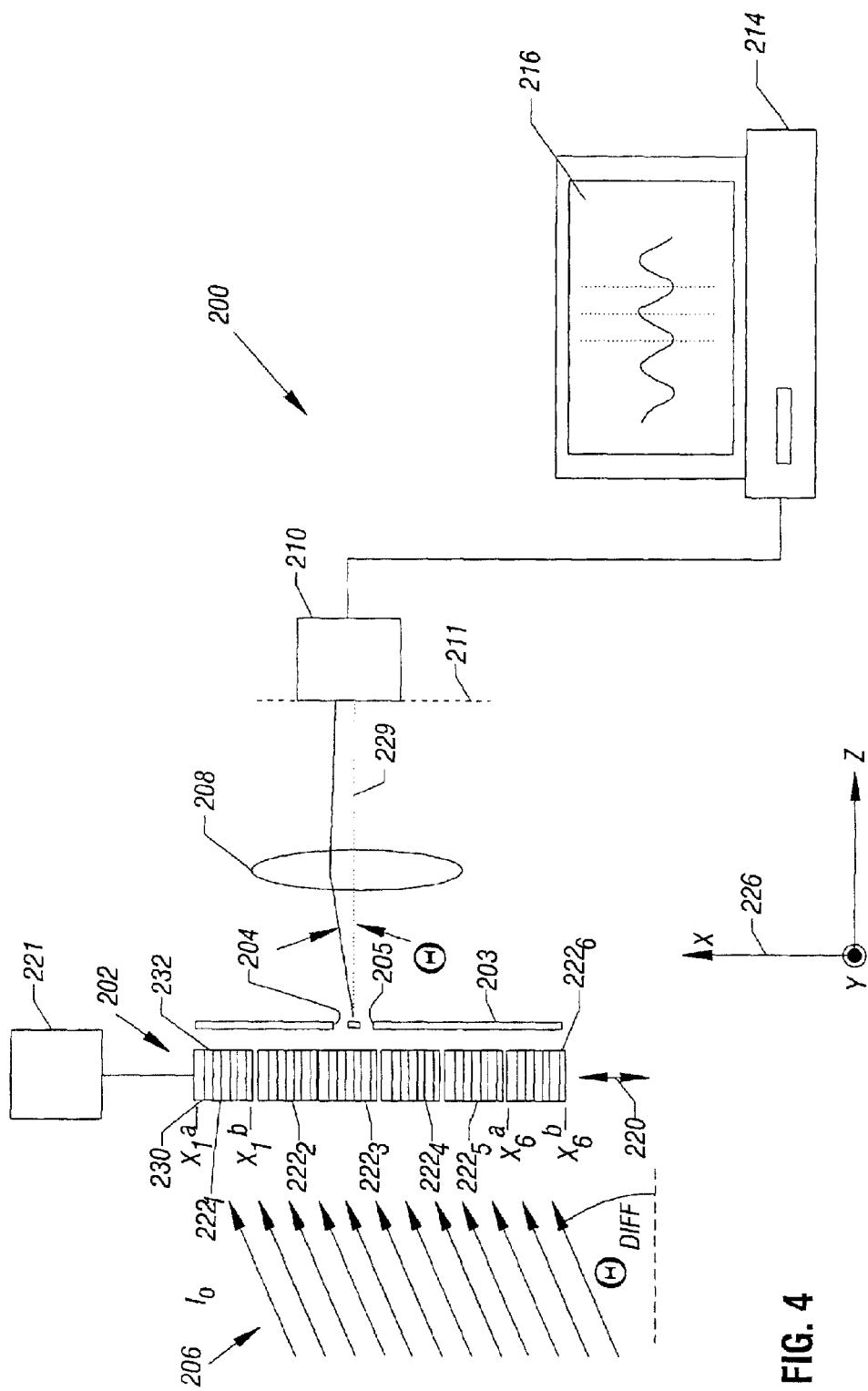
FIG. 4 is a schematic block diagram of an apparatus configured for measuring amplitude and phase contributions to an output field.

With reference to FIG. 4, an apparatus 200 configured for characterizing or measuring spatially dependent amplitude and phase contributions to an optical field incident to an optical element 202, such as a diffraction grating or phase mask. The apparatus 200 may be used to quantify the phase error so that the error may then be corrected as already described. The apparatus 200 may include an aperture plate 203 that defines slits 204, 205. In one embodiment, a well collimated optical source 206, such as a laser beam from a 1 mW frequency stabilized He—Ne laser (not shown) at a wavelength λ=633 nm, is expanded, collimated, and directed incident to normal to the element 202. A lens 208 is situated to receive optical radiation from slits 204, 205 and direct the radiation to a detector array 210 placed at a focal plane 211 of the lens 208. In an example, the slits 204, 205 are situated approximately 5 mm behind the element 202 and the lens 208 is a plano-convex lens having a 1 m focal length. The lens 208 is situated to direct a first order diffracted beam to the detector array 210. In a particular embodiment, the detector array 210 is a HAMAMATSU S3903-256Q diode array that includes 256 detector elements having a pixel size of 25 $\mu$m by 500 $\mu$m. The diode array is controlled using a HAMAMATSU 4070 driver amplifier board.

An electronic signal corresponding to the radiation distribution at the detector array 210 is communicated to a data processor 214 that is configured to store and analyze radiation distribution data. A display unit 215 may also be used. In a particular embodiment, the data processor 214 includes a National Instruments AT-MIO-16XE10 data acquisition board and a computer. In one embodiment, data acquisition, analysis, and data manipulation are performed with NATIONAL INSTRUMENTS LABVIEW software using a LABVIEW program that may be configured to determine the phase, period, and amplitude of the sinusoidal intensity pattern and the relative phase shifts of the pattern acquired by grating translation. The program and/or data can be stored on a hard disk or provided on a floppy disk or CD-ROM or other computer readable media.

The laser beam 206 (approximately a plane wave optical field) of intensity 10 is directed to the element 202. The element 202 is situated on a translation stage 221 and translated with respect to the slits 204, 205 along an axis 220 in one embodiment. The element 202 may include 6 contiguous segments 222$i$, for i=1, . . . 6 spanning respective intervals $x_i^b - x_i^a$ in one embodiment. The structure of the element 202 may be periodic along an x-axis 226.

The slits 204, 205 may be situated near a front surface 230 or a back surface 232 of the element 202. The optical field produced by the slits 204, 205 and the element 202 is recorded as a far-field intensity pattern at the detector array 210 while the segmented grating 202 is translated relative to the slits 204, 205. The analysis of the radiation pattern received by the detector array 210 is discussed below with reference to the slits 204, 205 but it will be apparent that apertures of other shapes and configurations can be used and the analysis of such arrangements is similar to the following two slit analysis.

As shown in FIG. 4, the incident beam 206 of intensity $I_0$ is incident at an angle $\theta_{diff}$ to the element 202 so that a portion of the beam 206 that propagates through the element 202 and the slits 204, 205 is approximately perpendicular to the element 202 in one embodiment. For example, the angle $\theta_{diff}$ can correspond to a diffraction angle of an $n^{th}$ diffraction order in a diffractive example. The lens 208 and detector array 210 are configured to receive portions of the incident beam that are diffracted at an angle θ with respect to an axis 229. As shown in FIG. 2A, the beam 206 is directed to the element 202 at an angle associated with a diffraction order of the element 202, in a diffractive embodiment, so that an appreciable portion of the beam 202 exits the element 202 perpendicularly. The incident beam 206 may be configured so that, in the absence of the aperture plate 203, a diffraction order of the element 202 propagates an angle θ of about θ=0 in one embodiment. In another embodiment, the apparatus is arranged such that the incident and diffracted beams form equal angles with the normal to the element. This arrangement minimizes the effect of small errors in the linearity of the translation stage on the accuracy of the phase measurement.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   producing a Bragg grating writing beam in an optical system;
   exposing a waveguide to said writing beam;
   determining the phase error; and
   moving said waveguide to said to compensate for said error.

2. The method of claim 1 wherein producing includes scanning a beam along phase mask.

3. The method of claim 2 including translating said waveguide with respect to said phase mask to correct the phase of a grating formed in said waveguide.

4. The method of claim 2 including determining the phase error and moving said waveguide relative to said phase mask to compensate for said error.

5. The method of claim 4 including using a phase extraction process to obtain the phase.

6. The method of claim 5 including measuring the reflected power from the grating versus wavelength.

7. The method of claim 6 including measuring the spectral response for gratings of different length.

8. The method of claim 7 including using the spectral responses for different grating lengths to obtain an estimate of the phase function of the grating.

9. The method of claim 8 including using the phase versus position to determine the phase error function.

10. The method of claim 9 including obtaining the phase error function by comparing the measured phase function with the specific spatial phase function designed for the grating.

11. The method of claim 10 including applying a phase correction to the grating that is equal and opposite to the phase error.

12. The method of claim 10 including adding the phase correction function to the designed phase function and then applying the error correction to the grating.

13. The method of claim 1 including writing a Bragg grating in a waveguide.

14. The method of claim 13 including writing a grating in a fiber.

15. The method of claim 1 wherein producing includes diffracting a beam to form two writing beams.

16. The method of claim 15 including diffracting each of said two writing beams to expose said waveguide.

17. The method of claim 16 including rotating a wedge in each of said writing beams.

18. The method of claim 17 including translating said waveguide relative to said wedge.

19. An apparatus to write a grating in a waveguide comprising:
- an optical source;
- an optical system to produce a writing beam to write a grating in a waveguide;
- a translation device to translate the waveguide relative to said optical system; and
- a control to determine the phase error and to move said waveguide to compensate for said error.

20. The apparatus of claim 19 wherein said translation device is coupled to said waveguide.

21. The apparatus of claim 19 wherein said optical system includes a phase mask and said control to move said waveguide relative to said phase mask to compensate for said error.

22. The apparatus of claim 19 wherein said optical system includes a diffraction grating that diffracts an optical beam to form two writing beams.

23. The apparatus of claim 22 including a pair of diffraction gratings positioned along the path of each of said writing beams to diffract said writing beams to said waveguide.

24. The apparatus of claim 23 including a rotatable wedge positioned in each of said writing beams.

25. The apparatus of claim 19 wherein said optical system includes a device to scan the writing beam along a phase mask.

* * * * *